US007543979B2

(12) United States Patent
Yeh

(10) Patent No.: US 7,543,979 B2
(45) Date of Patent: Jun. 9, 2009

(54) MEASURING APPARATUS FOR MICRO-AMOUNT OF MATERIALS

(76) Inventor: Neng-Kuei Yeh, No. 10, Lane 715, Ta Tung Street, Yung Kang, Tainan Hsien (TW)

(*) Notice: Subject to any disclaimer, the term of this patent is extended or adjusted under 35 U.S.C. 154(b) by 693 days.

(21) Appl. No.: 11/375,343

(22) Filed: Mar. 15, 2006

(65) Prior Publication Data

US 2007/0217284 A1 Sep. 20, 2007

(51) Int. Cl.
*B01F 15/02* (2006.01)
*B65B 1/32* (2006.01)
*G01G 19/22* (2006.01)

(52) U.S. Cl. ................. 366/141; 366/155.1; 366/179.1; 141/103; 414/21; 177/52

(58) Field of Classification Search ................. 366/141, 366/155.1, 179.1; 141/103; 414/21; 177/52
See application file for complete search history.

(56) References Cited

U.S. PATENT DOCUMENTS

| | | | | | |
|---|---|---|---|---|---|
| 1,812,604 | A | * | 6/1931 | Morrow | 366/179.1 |
| 2,068,646 | A | * | 1/1937 | Hexter | 141/103 |
| 2,460,605 | A | * | 2/1949 | Soissa | 366/158.5 |
| 2,548,106 | A | * | 4/1951 | Hancock et al. | 366/141 |
| 2,571,655 | A | * | 10/1951 | Beare | 366/179.1 |
| 2,825,190 | A | * | 3/1958 | Heald | 141/11 |
| 4,074,507 | A | * | 2/1978 | Ruf et al. | 141/103 |
| 4,525,071 | A | * | 6/1985 | Horowitz et al. | 366/141 |
| 4,850,304 | A | * | 7/1989 | Nicholson | 118/694 |
| 4,959,947 | A | * | 10/1990 | Reif | 141/103 |
| 4,966,463 | A | * | 10/1990 | Hihara et al. | 366/155.2 |
| 5,052,811 | A | * | 10/1991 | Akatsu et al. | 366/141 |
| 5,835,982 | A | * | 11/1998 | Lanaro et al. | 177/145 |
| 7,093,625 | B2 | * | 8/2006 | Smith et al. | 141/103 |
| 2007/0006942 | A1 | * | 1/2007 | Pluvinage et al. | 141/83 |
| 2008/0135129 | A1 | * | 6/2008 | Rhee et al. | 141/83 |

* cited by examiner

*Primary Examiner*—Tony G Soohoo
(74) *Attorney, Agent, or Firm*—Rosenberg, Klein & Lee

(57) ABSTRACT

A measuring apparatus includes several feeding mechanisms, a conveying mechanism, and receiving barrels as many as the feeding mechanisms; each feeding mechanism includes a storage barrel, a conduit connected to an outlet of the storage barrel, an elastic element in the conduit, and a transmission for rotating the elastic element so as to convey material forwards along the conduit; the conveying mechanism includes a guiding and bearing board for supporting the receiving barrels, a platform, a conveying machine for pushing the receiving barrels forwards, a propping power source for propping the platform upwards, and scales; the board has slots, and the scales are positioned on the platform for weighing materials added into the receiving barrels; each scale has propping rods thereon such that the scales will weigh materials added into the receiving barrels when moved up for the propping rods to pass through the slots and prop the receiving barrels.

3 Claims, 9 Drawing Sheets

MEASURING APPARATUS FOR MICRO-AMOUNT OF MATERIALS

BACKGROUND OF THE INVENTION

1. Field of the invention

The present invention relates to a measuring apparatus for micro-amount of materials, more particularly one, which includes several material feeding mechanisms each used for feeding a kind of material, scales and material receiving barrels as many as the material feeding mechanisms such that various kinds of materials can be added into the receiving barrels and weighed with the scales at a time.

2. Brief Description of the Prior Art

In manufacturing plastics, rubber products, foods, chemicals, and medicine, many different kinds of materials in small amount have to be added to adjust the property of the products such that function of the products are optimized. Because there are many different kinds of products, and each kind of product has many different ingredients, an accurate and fast measuring apparatus must be available for measuring the amount of various materials to be added. Currently, measurement is usually carried out manually, and inaccuracy and errors are inevitable, which can cause great loss. Furthermore, environmental factors will cause reduction to the accuracy in measurement even if automatic equipments are available. And, a manufacturing process will become inefficient if measurement of micro-amount of materials takes too much time.

Referring to FIG. 10, a currently existing measuring apparatus includes several material containing barrels 4, a receiving barrel 5 below the material containing barrels 4, and a conveying device 6. The receiving barrel 5 is supported on the conveying device 6, and it is equipped with a scale 51 for weighing added materials. Each of the material containing barrels 4 is equipped with a threaded rod 41, which will rotate to feed materials. In using the measuring apparatus, the receiving barrel 5 is moved with the conveying device 6, and materials are fed into the receiving barrel 5 from the material containing barrels 4 in sequence, and weighed by means of the scale 51. It can be easily seen that the measuring apparatus is inconvenient to use; firstly, it takes too much time for the receiving barrel 5 to receive materials fed from all of the material containing barrels 4; secondly, if the users want to use the material containing barrels 4 to contain other kinds of materials, they first have to dismantle and wash the material containing barrels 4, which are equipped with the threaded rods 41, and take much time and labor to dismantle.

SUMMARY OF THE INVENTION

It is a main object of the present invention to provide an improvement on a measuring apparatus for micro-amount of materials to overcome the above-mentioned problems. The measuring apparatus of the present invention includes several material feeding mechanisms, a conveying mechanism, and receiving barrels as many as the material feeding mechanisms. Each material feeding mechanism includes a storage barrel for containing a kind of material, a rotating disk with a pushing plate in a lower end of the storage barrel, a conduit connected to an outlet of the storage barrel, an elastic element in the conduit with one end being near to an outlet of the conduit, a transmission mechanism connected to other end of the elastic element, and a vibrator connected to an outer circumferential side of the conduit. The conveying mechanism includes a conveying machine, a guiding and bearing board, a platform, a propping power source for propping the platform upwards, and several scales; the guiding and bearing board has slots thereon; the receiving barrels are positioned on the guiding and bearing board, and the conveying machine has several blocking rods next to the receiving barrels for pushing the material receiving barrels forwards; the scales are positioned on the platform for weighing materials added into the receiving barrels. Each of the scales has propping rods thereon; thus, the scales will weigh materials added into the receiving barrels when they are lifted together with the platform for the propping rods to pass through the slots and prop the receiving barrels. Therefore, various kinds of materials can be added into the receiving barrels and weighed with the scales at a time, and it will save time to use the measuring apparatus.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
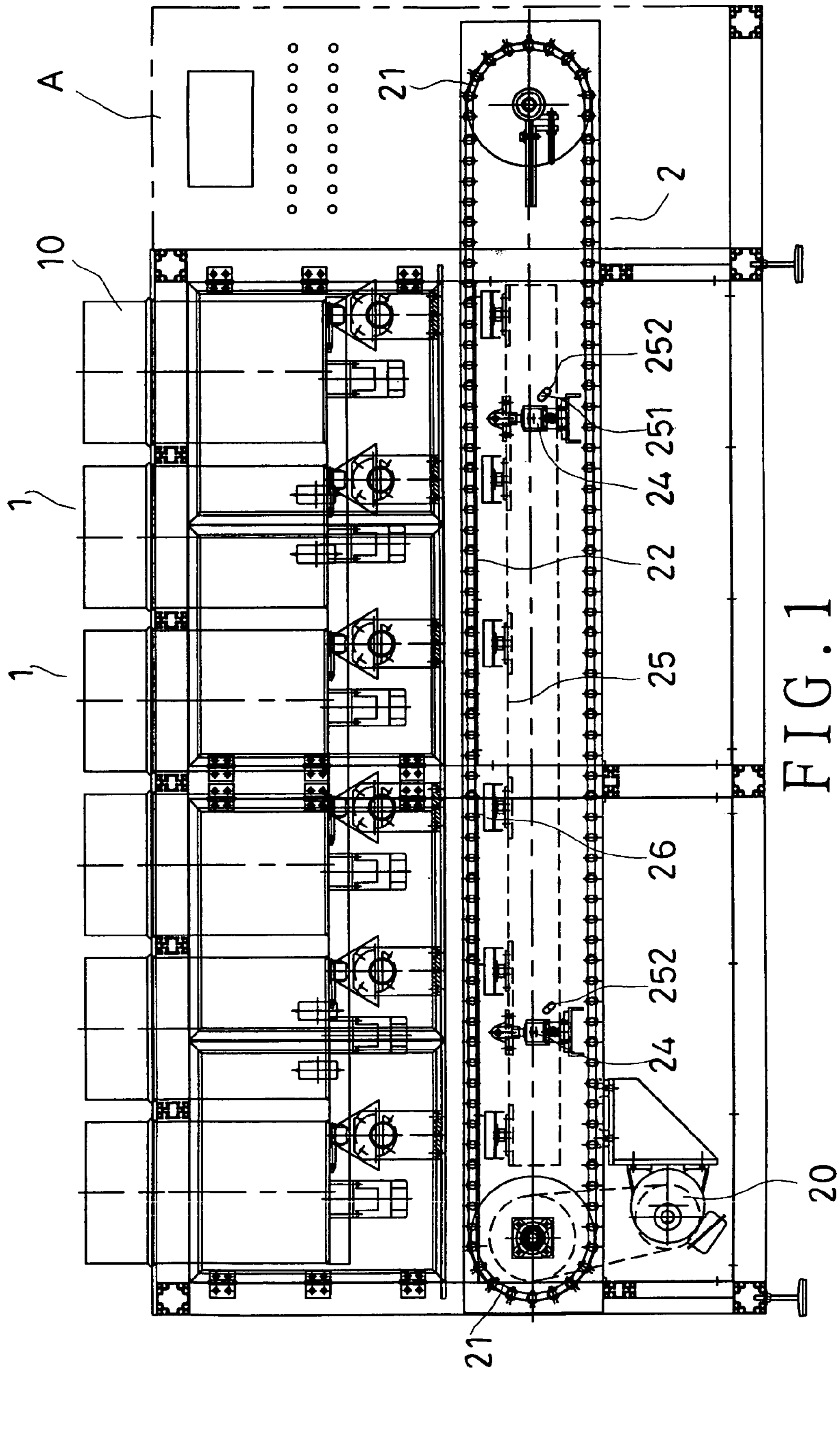
FIG. 1 is a front view of the present invention.
Figure 2:
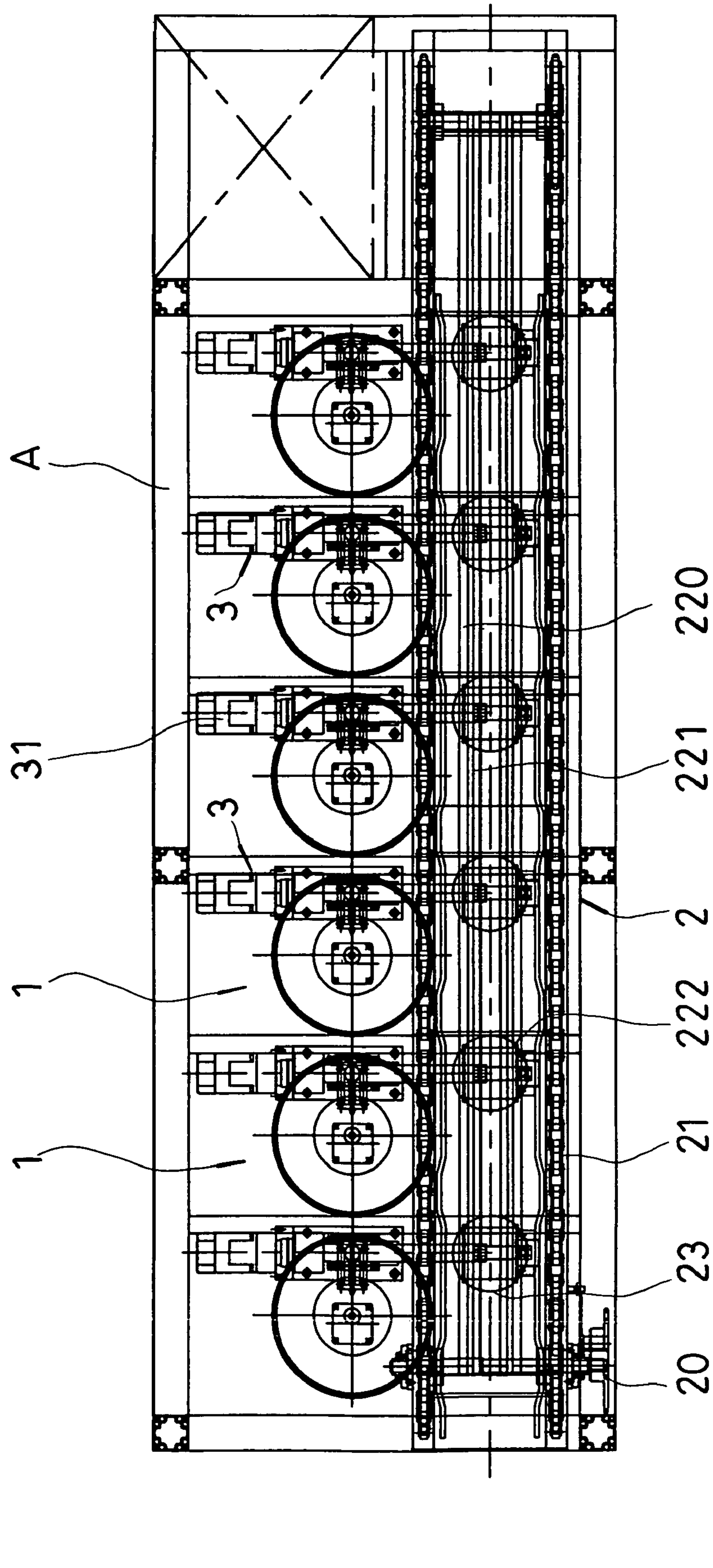
FIG. 2 is a top view of the present invention.

Referring to FIGS. 1 and 2, a preferred embodiment of a measuring apparatus for micro-amount of materials includes several material feeding mechanisms 1, and a conveying mechanism 2.

Figure 3:
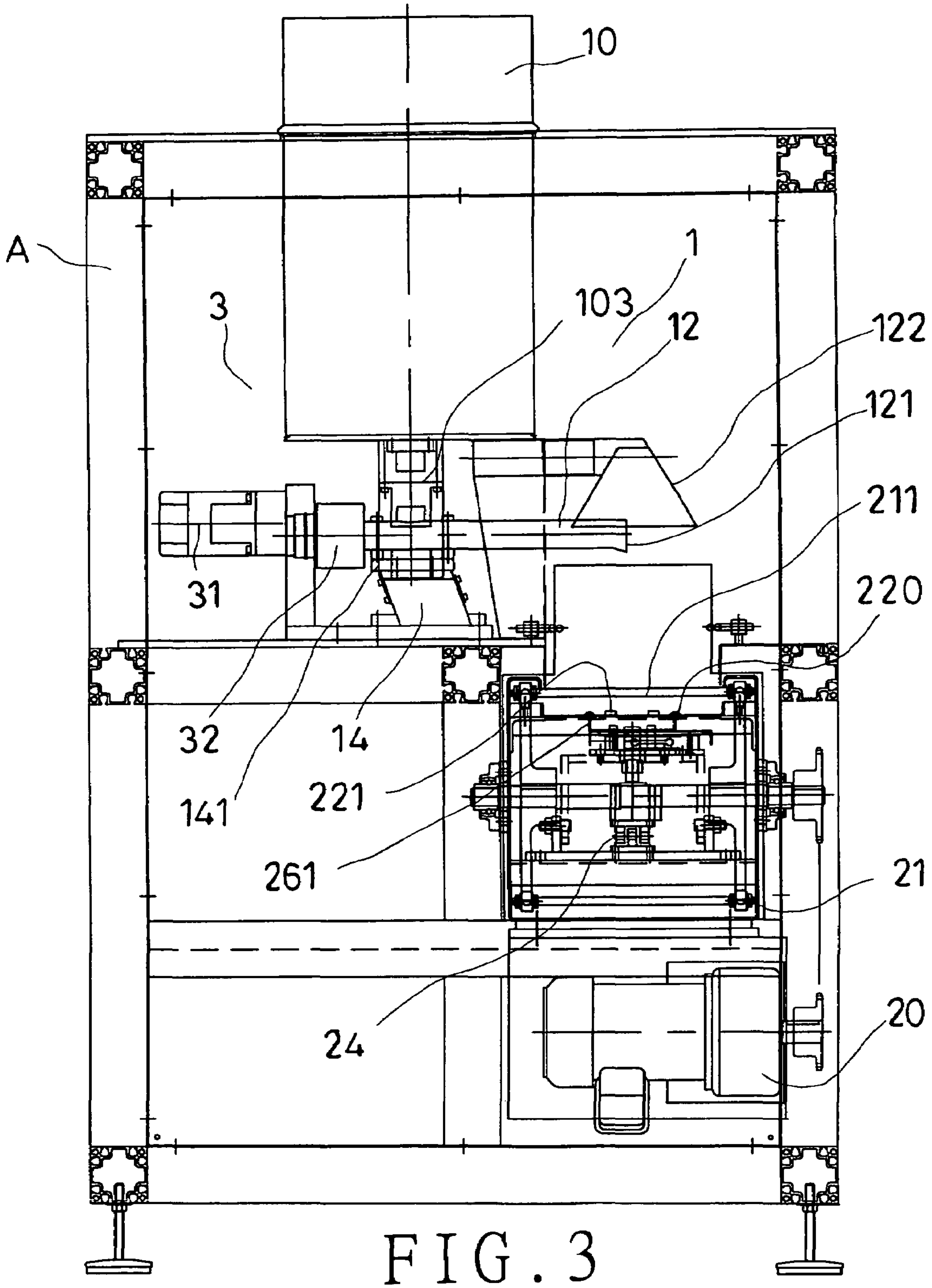
FIG. 3 is a side view of the present invention.
Figure 4:
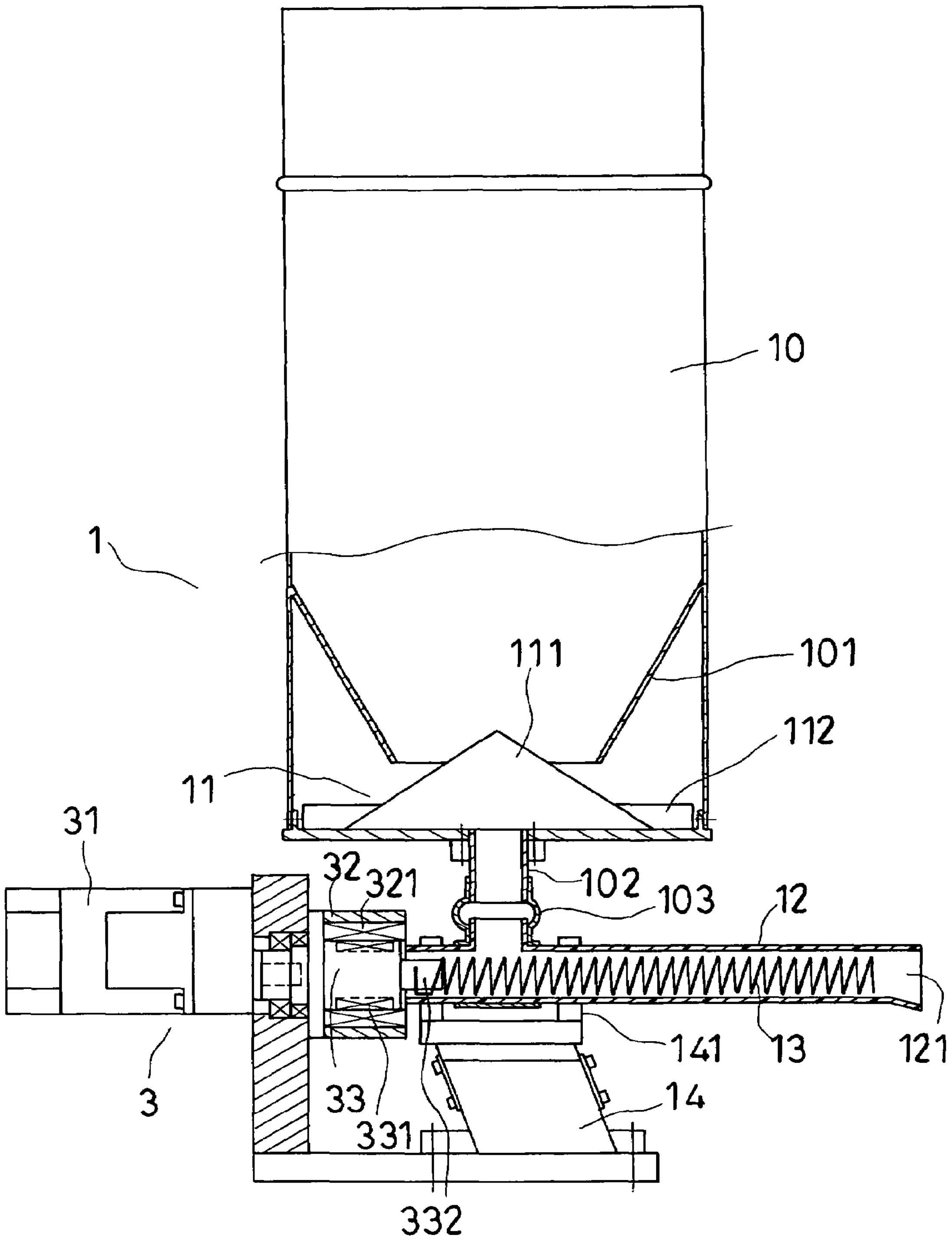
FIG. 4 is a sectional view of the material feeding mechanism of the present invention.
Figure 5:
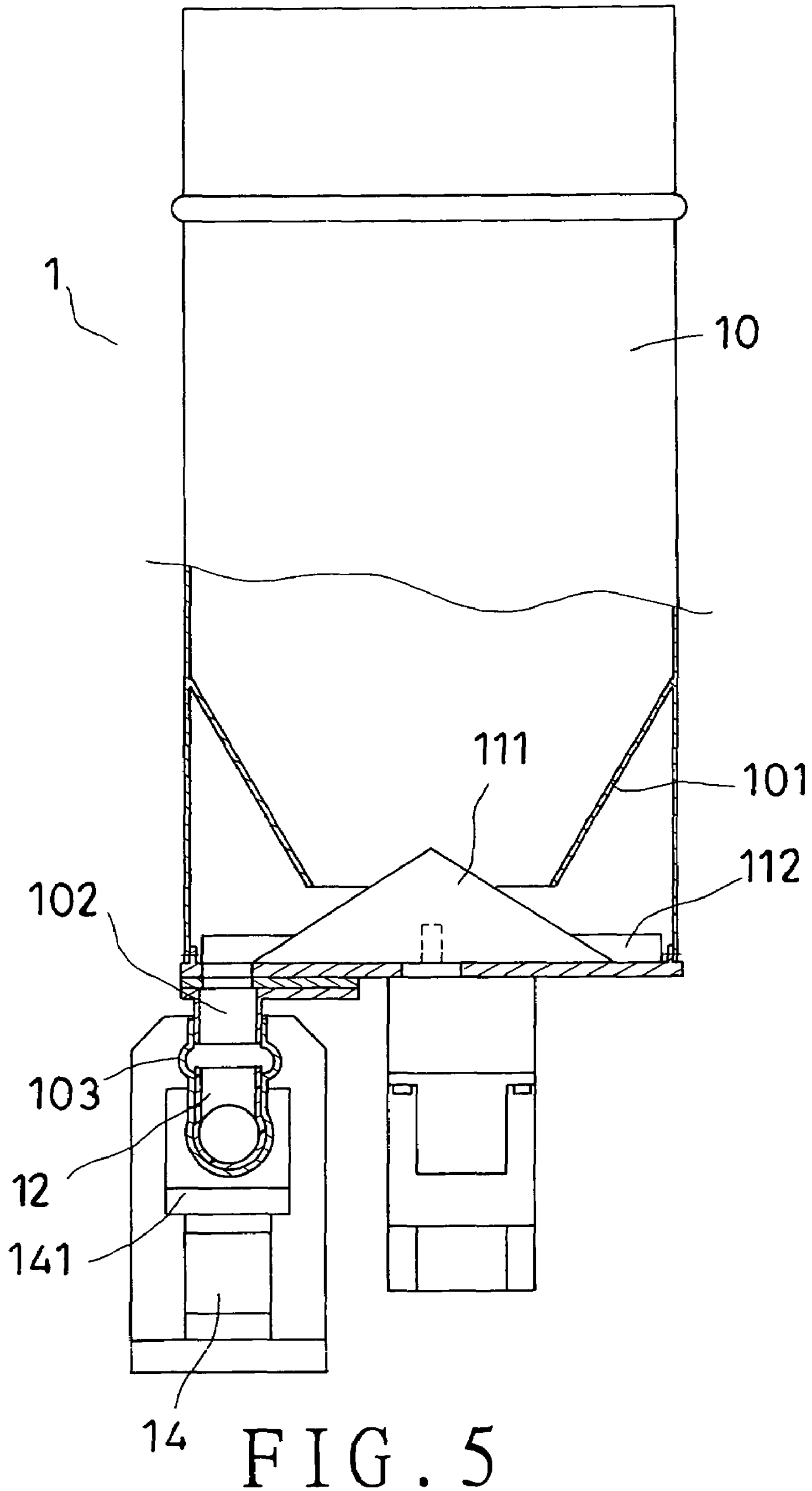
FIG. 5 is a front view of the material feeding mechanism of the present invention.
Figure 6:
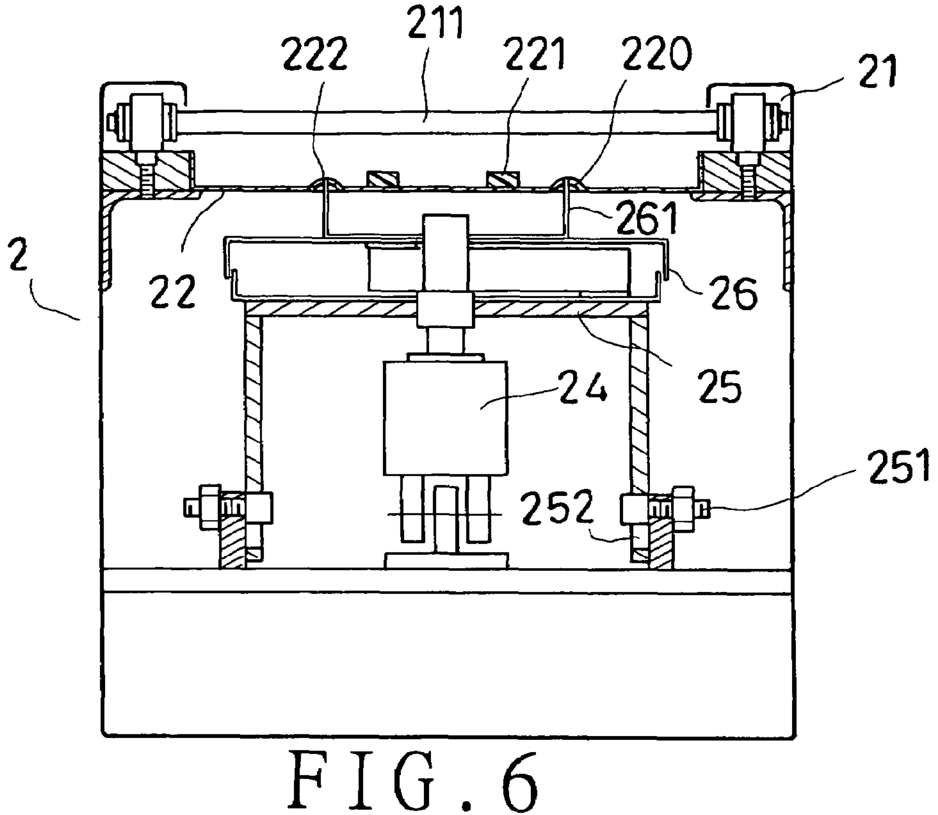
FIG. 6 is a sectional view of the conveying mechanism of the present invention (1)
Figure 8:
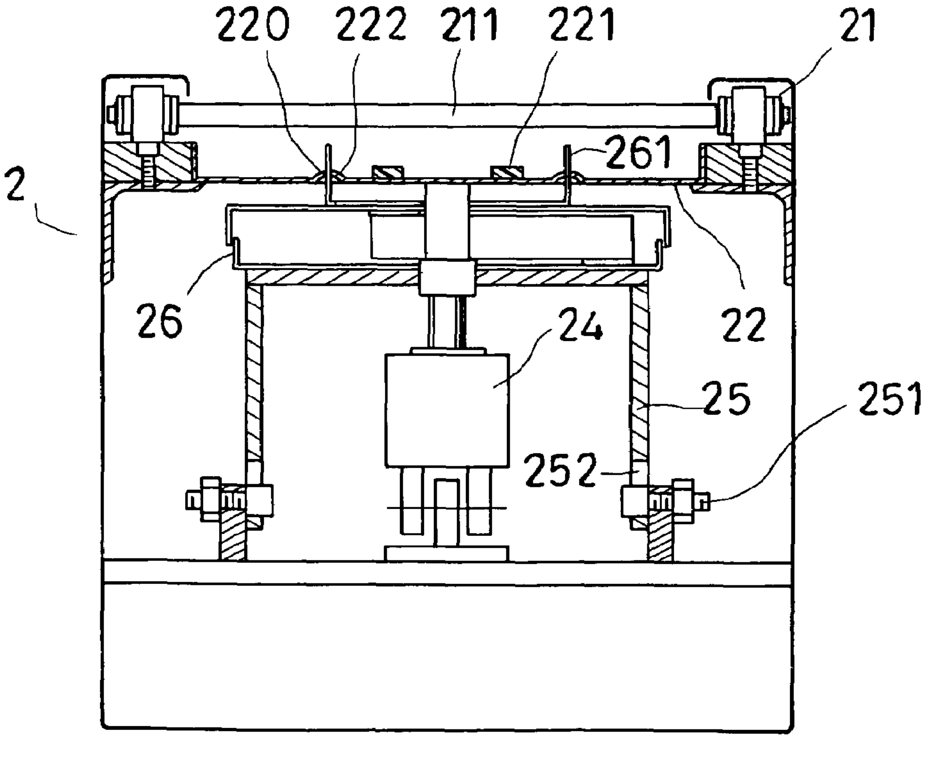
FIG. 8 is a sectional view of the conveying mechanism (2)
Figure 7:
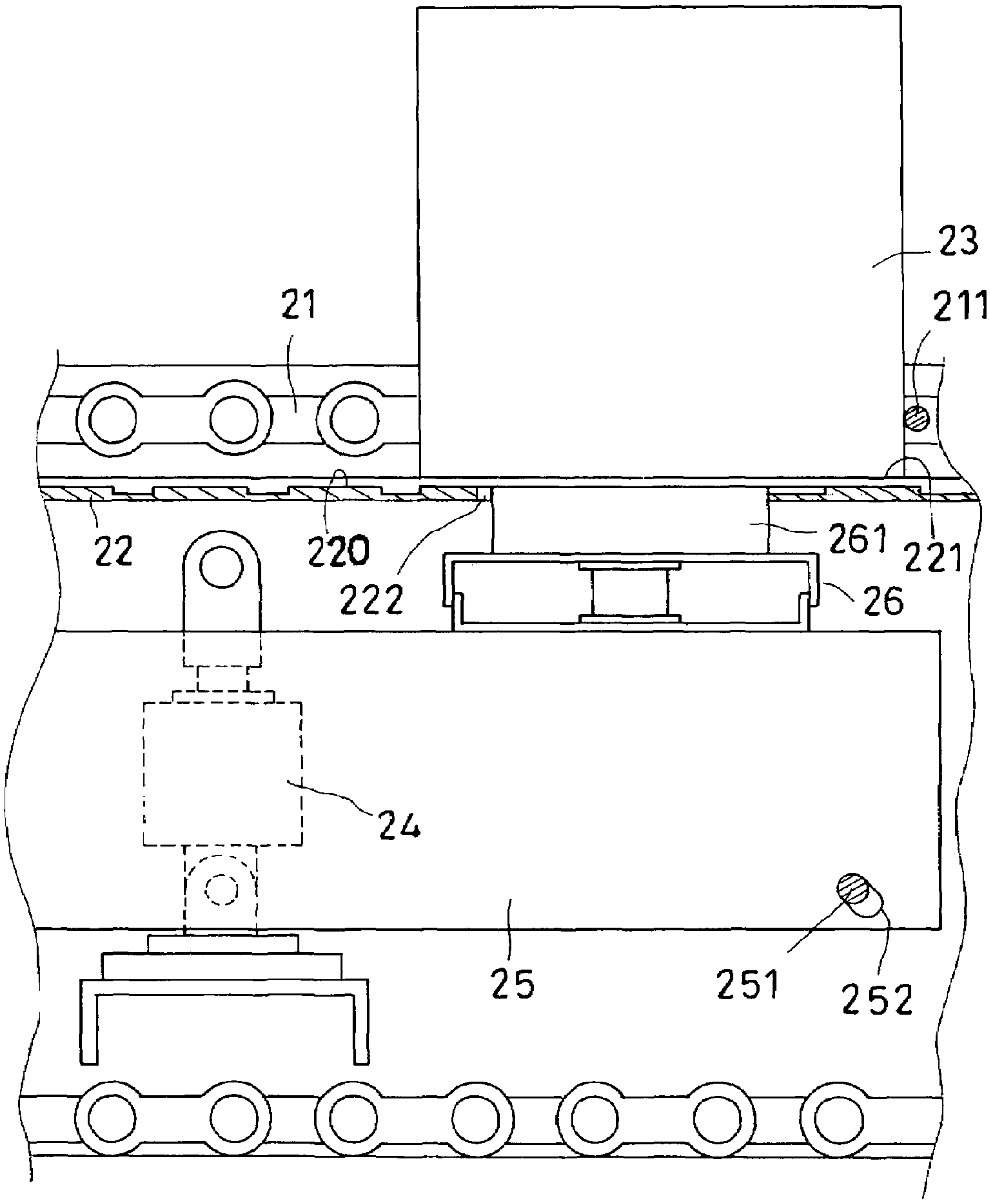
FIG. 7 is a view of the conveying mechanism in motion (1)
Figure 9:
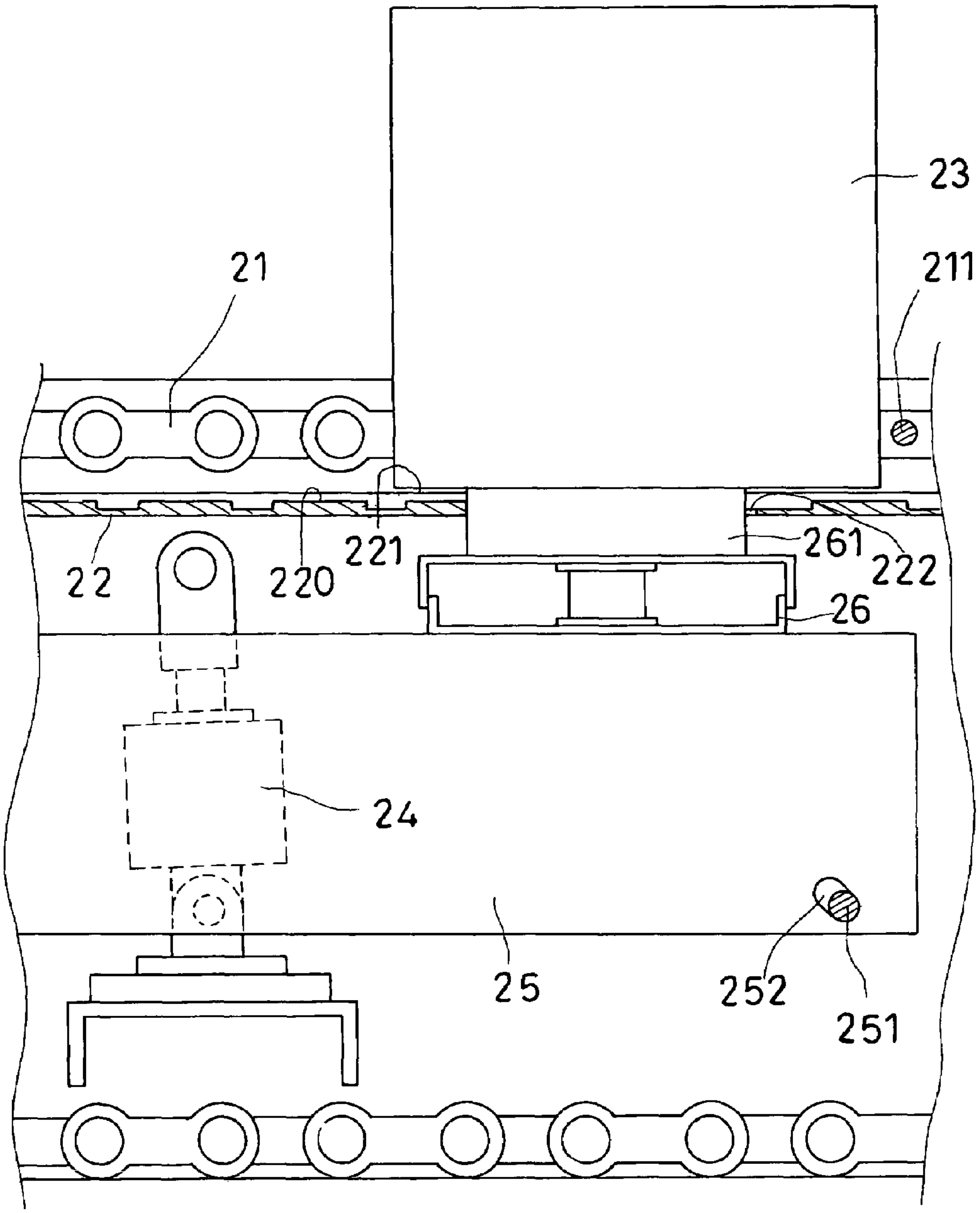
FIG. 9 is a view of the conveying mechanism in motion (2)
Figure 10:
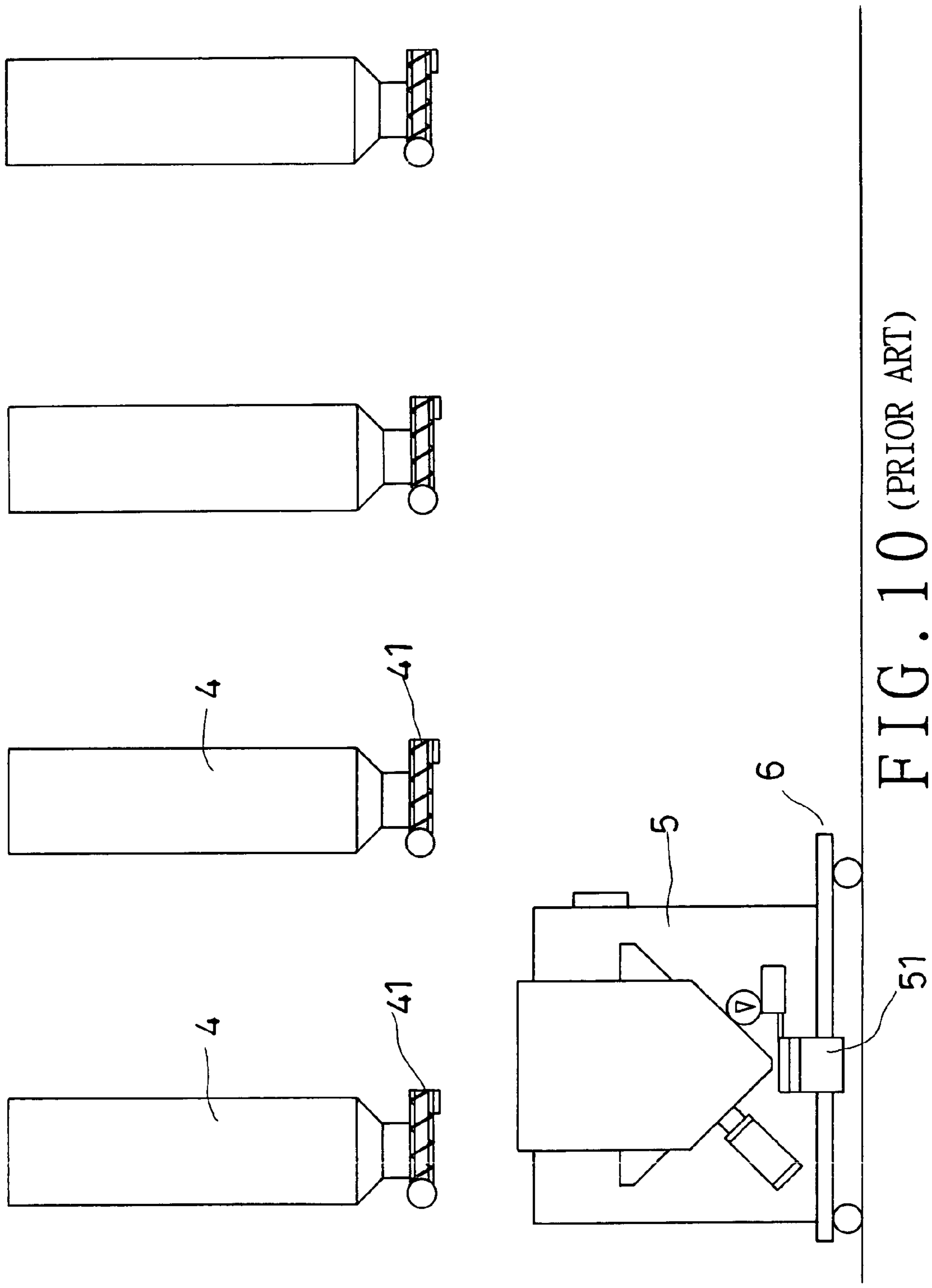
FIG. 10 (PRIOR ART)
FIG. 10 is a front view of the currently existing measuring device.

The material feeding mechanisms 1 are held in a machine body (A). Referring to FIGS. 3 to 5, each of the material feeding mechanisms 1 has a storage barrel 10, a rotating disk 11, a material conduit 12, and a vibrator 14; the storage barrel 10 has an outlet portion 102 at a bottom thereof, and a conical guide part 101 therein for guiding materials; the rotating disk 11 includes a conical base 111, and a pushing plate 112 connected to the conical base 111, and it is positioned under the conical guide part 101 of the storage barrel 10; a coupling 103 is connected to the outlet portion 102 and the material conduit 12 at two ends; the material conduit 12 has an elastic element 13 therein; the elastic element 13 is near to a material outlet 121 of the material conduit 12 at one end, and connected to a transmission mechanism 3 at the other end; the vibrator 14 has a fixing seat 141, and is connected to an outer circumferential side of the material conduit 12.

Each transmission mechanism 3 has a power source 31, an external shaft 32 connected to the power source 31, an internal shaft 33; the external shaft 32 has a magnetic element 321 fitted therein; the internal shaft 33 has a magnet element 331 positioned around an outer circumferential side thereof, and it is fitted in the external shaft 32; the internal shaft 33 has a shaft end 332 connected to the corresponding elastic element 13.

The conveying mechanism 2 includes a power source 20, a conveying machine 21, a guiding and bearing board 22, the same number of material receiving barrels 23 as the material feeding mechanisms 1, a propping power source 24, a platform 25, and scales 26; the conveying machine 21 is moved by means of the power source 20; the guiding and bearing board 22 is positioned in the conveying machine 21, and it has several elongate protrusions 220, and several sliding ribs 221 thereon, which are slightly higher than the elongate protrusions 220; each of the elongate protrusions 220 has a slot 222 thereon; the material receiving barrels 23 are usually supported on the sliding ribs 221 of the guiding and bearing board 22; the conveying machine 21 has blocking rods 211, which are next to the material receiving barrels 23 for pushing the material receiving barrels 23 forwards; the platform 25 is positioned under the guiding and bearing board 22, and the propping power source 24 is used for propping the platform 25 upwards; the platform 25 has sloping slots 252 on two lateral sides thereof, and insertion rods 251 are passed through respective ones of the sloping slots 252; the scales 26 are positioned on the platform 25 for weighing materials added into the material receiving barrels 23; each of the scales 26 has propping rods 261 thereon, which are passed through the slots 222 on the elongate protrusions 220 of the guiding and bearing board 22.

To use the present measuring apparatus, different kinds of materials are stored in respective ones of the storage barrels 10 of the material feeding mechanism 1, and the scale 26 is set in respect of weight proportions of the different kinds of materials. Referring to FIGS. 4, and 6 to 9, in operation, the power source 20 of the conveying mechanism 2 moves the conveying machine 21 with the blocking rods 211 a certain set distance, and in turn the blocking rods 211 push the material receiving barrels 23 forwards along the guiding and bearing board 22; the material receiving barrels 23 can move along the guiding and bearing board 22 more easily because of the sliding ribs 221 on the guiding and bearing board 22, which reduce area of contact between the material receiving barrels 23 and the guiding and bearing board 22. When the material receiving barrels 23 are right under the material conduits 12 of the material feeding mechanism 1, they will stops moving, and the propping power source 24 of the conveying mechanism 2 will work to prop the platform 25, and in turn the platform 25 moves upwards in a direction parallel to the elongate sloping slots 252, and the propping rods 261 of the scales 26 stick upwards through the slots 222 of the guiding and bearing board 22, and prop the material receiving barrels 23 off the blocking rods 211 for allowing the scales 26 to weigh materials added into the material receiving barrels 23 and preventing contact between the blocking rods 211 and the material receiving barrels 23, which contact would cause errors in weighing. When the material receiving barrels 23 are moved upwards to such a position as to be right under the material outlets 121 of the material conduits 12 of the material feeding mechanism 1, the materials stored in the storage barrels 10 will fall into the conical bases 111 of the rotating disks 11 through the conical guide parts 101, and the materials are conveyed to the outlet portions 102 of the storage barrels 10 with the help of the conical bases 111 and by means of rotation of the pushing plate 112. Next, the materials fall into the material conduits 12 through the outlet portions 102 and the couplings 103, and the power source 31 of the transmission mechanisms 3 work to rotate the external shafts 32, and the magnetic elements 321 of the external shafts 32 make the internal shafts 33 rotate together with the external shafts 32 owing to magnetic attraction between the magnetic elements 321 and 331, and in turn the elastic elements 13 connected to the shaft ends 332 are rotated to push the materials forwards. At the same time, the vibrators 14 vibrate such that the materials are moved through the material outlets 121 of the material conduits 12, and fall into the material receiving barrels 23 by means of rotational movement of the elastic elements 13 and vibration of the material conduits 12. The adding action is stopped as soon as the weight of added materials, which are weighed with the scales 26, is equal to a predetermined value. Next, the propping power source 24 of the conveying mechanism 2 returns, and the material receiving barrels 23 are returned and supported on the guiding and bearing board 22, and then the material receiving barrels 23 are pushed forwards by means of the blocking rods 211 of the conveying machine 21 for allowing other kinds of materials to be added into the material receiving barrels 23.

Because there are the plural material feeding mechanisms 1 available for feeding respective ones of several different kinds of materials in the machine body (A), and the material receiving barrels 23 are as many as the material feeding mechanisms 1, different kinds of materials can be added into the material receiving barrels 23 and weighed with the scales 26 at a time. Therefore, the measuring apparatus is time-efficient, capable of finishing adding and weighing materials in a relatively short length of time.

Referring to FIGS. 3 and 4, each of the material feeding mechanisms 1 is further equipped with a dust collector 122 at the material outlet 121 of the material conduit 12; thus, dust will be collected, which is produced when materials are conveyed forwards by means of rotating the elastic elements 13 and vibrating the material conduits 12.

The material conduits 12 of the material feeding mechanisms 1 can be made of transparent glass such that people are allowed to see the insides of the material conduits 12 to check whether the material conduits 12 are clogged with materials.

Furthermore, rotational speed of the power sources 31 and vibratory speed of the vibrators 14 of the material feeding mechanisms 1 can be adjusted so as to adjust the length of time it takes to add materials into the material receiving barrels 23 according to the predetermined weight proportions of different kinds of materials.

From the above description, it can be seen that the micro-amount measuring apparatus of the present invention has the following advantages over the prior art described in Background:

1. Several different kinds of materials can be added into the material receiving barrels and weighed with the scales at a time because there are plural material feeding mechanisms available for feeding respective ones of several different kinds of materials in the machine body, and the material receiving barrels are as many as the material feeding mechanisms. Therefore, the measuring apparatus is more time-efficient.

2. Because the transmission mechanisms of the material feeding mechanisms are equipped with external shafts and internal shafts, which function based on principle of magnetic attraction, and because the material conduits and the elastic elements are used, the material feeding mechanisms can be easily dismantled and assembled. Therefore, the present invention is more convenient to use.

What is claimed is:

1. An apparatus for measuring micro-amount of materials, comprising (a) a plurality of material feeding mechanisms held in a machine body, each of said material feeding mechanisms including:

a storage barrel for containing a kind of material; the storage barrel having an outlet portion at a bottom thereof;

a rotating disk with a pushing plate in a lower end of the storage barrel;

a material conduit, the material conduit being connected to the outlet portion of the storage barrel with a coupling;

an elastic element held in the material conduit; the elastic element being near to a material outlet of the material conduit at one end thereof;

a transmission mechanism connected to other end of the elastic element; and a vibrator with a fixing seat, the material conduit being connected to the fixing seat of the vibrator at an outer circumferential side thereof;

(b) a conveying mechanism, the conveying mechanism including:

a power source;

a conveying machine actuated by means of the power source;

a guiding and bearing board in the conveying machine, said guiding and bearing board having a plurality of sliding ribs, and slots thereon;

a plurality of material receiving barrels on the sliding ribs of the guiding and bearing board, the conveying machine having a plurality of blocking rods, which are next to the material receiving barrels for pushing the material receiving barrels forwards;

a platform, the platform having sloping slots on two lateral sides thereof; insertion rods being passed through respective ones of the sloping slots of the platform;

a propping power source for propping the platform upwards; and a plurality of scales positioned on the platform for weighing materials added into the material receiving barrels; each of the scales having propping rods thereon, which face the slots of the guiding and bearing board; the scales being going to weigh materials added into the material receiving barrels when they are moved upwards together with the platform for the propping rods to pass through the slots of the guiding and bearing board and prop the material receiving barrels.

2. The apparatus for measuring micro-amount of materials as recited in claim 1, wherein each of said rotating disks having a conical base in the outlet portion of a corresponding storage barrel.

3. The apparatus for measuring micro-amount of materials as recited in claim 1, wherein each of said transmission mechanisms has:

a power source, an external shaft connected to the power source, the external shaft having a magnetic element fitted therein; and an internal shaft, the internal shaft having a magnet element positioned around an outer circumferential side thereof; the internal shaft being fitted in the external shaft; the internal shaft having a shaft end connected to a corresponding one of said elastic elements.

* * * * *